United States Patent Office

Re. 25,238
Reissued Sept. 11, 1962

25,238

POLYNUCLEAR NITROGEN-CONTAINING COMPOUNDS AND PROCESS OF MAKING SAME

Rudolph A. Carboni, Wilmington, Del., assignor to E. I. du Pont de Nemours and Company, Wilmington, Del., a corporation of Delaware No Drawing. Original No. 2,904,544, dated Sept. 15, 1959, Ser. No. 716,276, Feb. 20, 1958. Application for reissue June 2, 1961, Ser. No. 115,859
11 Claims. (Cl. 260—205)

Matter enclosed in heavy brackets [ ] appears in the original patent but forms no part of this reissue specification; matter printed in italics indicates the additions made by reissue.

This invention relates to new nitrogen-containing compounds having two benzenoid rings, to each of which are attached in the ortho position two nitrogens which in turn are bonded only to nitrogen. More particularly, this invention relates to o,o'-diazidoazobenzene, 2-(o-azidophenyl)benzotriazole, and [dibenzo-1,2,5,6-tetraazacyclooctatetraene] *dibenzo-1,3a,4,6a-tetraazapentalene,* their preparation and substitution products of the latter compound by electrophilic reagents.

Polynuclear nitrogen-containing compounds are an important class of organic materials. Considerable effort has been expended on their preparation. Many have biological activity while others are useful as dyes or as precursors for valuable products, e.g., as dye intermediates. In general, polynuclear compounds that contain several ring nitrogen atoms have been found heretofore to be deficient in stability.

It is an object of this invention to provide new nitrogen-containing organic cyclic compounds which are stable to heat and strong chemical reagents. A further object is to provide new compounds having two benzenoid rings to each of which are attached in the ortho position two nitrogens, electronegative carbocyclic nuclear substitution products thereof and methods of their preparation. A still further object is to provide useful products which are readily obtained from o,o'-diazidoazobenzene. Other objects will appear hereinafter.

These and other objects of this invention are obtained by providing nitrogen-containing compounds having two benzenoid rings, each ring having bonded to it in the ortho position two nitrogens the remaining bonds of said nitrogens being satisfied through bonding to one or two other nitrogens. The nitrogens are either bonded to each other or to carbon of the benzenoid rings and the two benzenoid rings are connected to each other solely through a plurality of the nitrogen atoms.

The new compounds of this invention are [dibenzo-1,2,5,6-tetraazacyclooctatetraene] *dibenzo-1,3a,4,6a-tetraazapentalene* and its electrophilic substitution products, shown below as Formula I, as well as the intermediates o,o'-diazidoazobenzene and 2-(o-azidophenyl)benzotriazole. [Dibenzo-1,2,5,6-tetraazacyclooctatetraene] *Dibenzo-1,3a,4,6a-tetraazapentalene* and its electronegative carbocyclic nuclear substitution products can be represented by the general structural formula

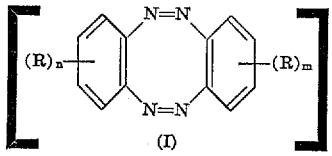

(I)

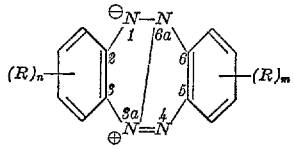

(I)

wherein the R's are the same or different and represent an electronegative substituent, e.g., halo (such as chlorine or bromine), nitro, or sulfo radicals, and n and m are cardinal numbers of zero to three.

The process for obtaining [dibenzo-1,2,5,6-tetraazacyclooctatetraene] *dibenzo-1,3a,4,6a-tetraazapentalene* (see "C" in equation below) involves the decomposition of o,o'-diazidoazobenzene (see "A" below) under controlled conditions. An intermediate in the decomposition is 2-(o-azidophenyl)benzotriazole (see "B" below). The decomposition is generally effected at temperatures of 40–200° C. Temperatures of less than 100° C. give the benzotriazole from o,o'-diazidoazobenzene while temperatures of over 100° C., e.g., about 100–200° C., give the [tetraazacyclooctatetraene] *tetraazapentalene,* either from the diazidoazobenzene or the azidophenylbenzotriazole[.]. An alternate method for the decomposition of the diazidoazobenzene is by the use of energy from actinic light.

The decomposition reactions are represented by the following equations:

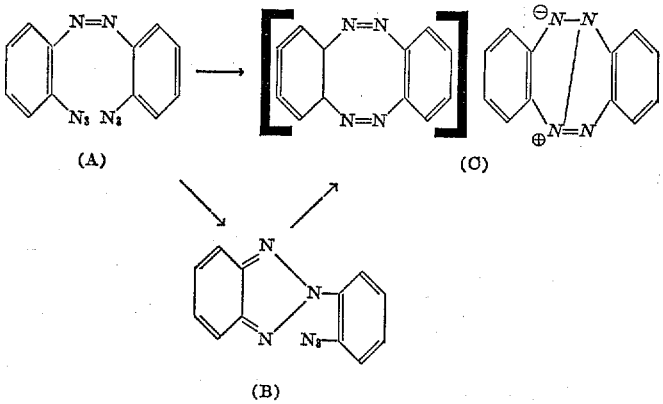

(A) (B) (C)

The starting material, i.e., o,o'-diazidoazobenzene, is obtained by transformation of amino groups of o,o'-diaminoazobenzene to the corresponding azide groups. This is preferably accomplished by diazotization followed by reaction with an alkali metal azide, preferably sodium azide, under acid conditions at a temperature that is preferably below 20° C., generally 0–10° C.

The diazidoazobenzene, which has eight atoms of nitrogen, can lose some of its nitrogen atoms upon the application of energy. Although the purified compound has a melting point, with decomposition, of above 100° C., the compound is less stable in solution. Thus, solutions o,o'-diazidoazobenzene in inert solvents decompose ıder the influence of light or at temperatures of, e.g., ı to 75° C. by loss of two atoms of nitrogen to produce (o-azidophenyl)benzotriazole.

Heating the o,o'-diazidoazobenzene at higher tempera- res, i.e., above 100° C., or subjecting it to actinic diation for long periods of time, brings about forma- ɔn of [dibenzo-1,2,5,6-tetraazacyclooctatetraene] *di- nzo-1,3a,4,6a-tetraazapentalene* with the loss of four ɔms of nitrogen. Heating 2-(o-azidophenyl)benzo- azole also brings about the formation of [dibenzo- 2,5,6 - tetraazacyclooctatetraene] *dibenzo - 1,3a,4,6a- traazapentalene* with loss of two atoms of nitrogen. 'eferably, the transformation is effected in solution in liquid cyclic hydrocarbon solvent. In the heating proc- s, the upper limit of temperature is not of prime im- ɔrtance since the final product is exceptionally stable. . general, temperatures of over 200° C. are unneces- ry to bring about the formation of the new [eight- embered] ring compound, i.e., [dibenzo-1,2,5,6-tetra- ıacyclooctatetraene] *dibenzo-1,3a,4,6a-tetraazapental- 'e.*

The [dibenzotetraazaoctatetraene] *dibenzotetraaza- ɪntalene* has an unusually stable ring structure. It is ɔt degraded by heat at least up to its melting point. It ɪn be recovered after treatment with warm concen- ated sulfuric acid. Electrophilic reagents (see Finar, )rganic Chemistry," vol 1, sec. ed. 1953, Longmans, reen & Co., London, page 444) bring about substitu- ɔn on the benzene rings. Included are nitro, halo, or ılfo groups. Although the maximum number of such ıbstituents can be four on each ring on a theoretical ısis, the number usually obtained does not exceed three.

An alternate but less preferred method of obtaining ıe benzenoid substituted [tetraazacyclooctatetraenes] *traazapentalenes* involves starting with the appropriate ıbstituted o,o'-diaminoazobenzenes. Such compounds ave the formula

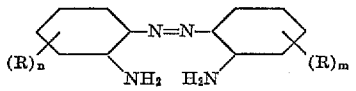

(II)

'herein R is an electronegative substituent and n and ı are cardinal numbers of up to three. Particularly ıitable electrophilic groups are the halogen (especially ılorine and bromine), nitro and sulfo groups. Substi- ıtion products of [dibenzo-1,2,5,6-tetraazacycloocta- ɪtraene] *dibenzo-1,3a,4,6a-tetraazapentalene* are, how- ver, preferably obtained by use of halogenating, ni- ating and sulfonating reagents upon the [cycloocta- ɪtraene (c)] *tetraazapentalene (C)*. The reagents em- loyed do not degrade the new ring system. By regu- ıting the strength and conditions of the reactions, the umber of substituent groups can be varied from one to s high as six, i.e., n and m in Formula I can be cardinal umbers of up to 3 and R can be Cl, Br, $NO_2$, or $SO_3H$.

The following examples further illustrate the prepara- on and properties of the new compounds of this inven- on.

EXAMPLE I

Preparation of o,o'-Diazidoazobenzene

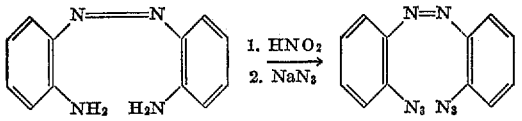

(A) To a stirred mixture of 4.3 (0.02 mole) of ,o'-diaminoazobenzene in 40 ml. of conc. hydrochloric cid and 40 ml. water at 5° C. there was gradually added .0 g. (0.058 mole) of sodium nitrite in 20 ml. of water. 'he insoluble amine hydrochloride gradually dissolved as he diazonium salt formed. The mixture was stirred t 5° C. for an additional hour. Urea was then added to destroy any excess nitrous acid. Sodium azide (3.8 g., 0.06 mole) in 20 ml. of water (5° C.) was slowly added with stirring. Nitrogen was evolved and a colored solid precipitated. The mixture was stirred for 30 minutes at 5° C. and for 2 hours at room temperature. The solid o,o'-diazidoazobenzene had a melting point, with dec., of 107–108° C. and an infrared spectrum consistent for the structure.

Analysis.—Calcd. for $C_{12}H_8N_8$: C, 54.54; H, 3.05; N, 42.41. Found: C, 54.75; H, 3.31; N, 42.37.

(B) When the above general procedure was repeated except that twice the quantities were employed, a 79% yield of o,o'-diazidoazobenzene, M.P. 110–111° C. (dec.), was obtained.

EXAMPLE II

Preparation of 2-(o-Azidophenyl)benzotriazole

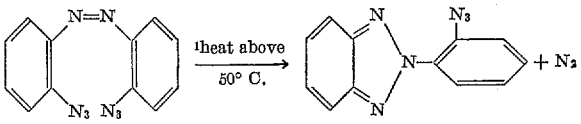

(A) 0.5-g. sample of o,o'-diazidoazobenzene was dissolved in 100 ml. of ether and refluxed (35° C.) for 4 hours. There was no apparent change in the orange-colored solution. The ether was removed, replaced by acetone and the solution refluxed (58° C.) for 1½ hours, during which time the orange color was replaced by a yellow-brown color. Most of the acetone was removed, water added, then a little fresh acetone added. An oily solid, M.P. 60–63° C., was obtained. Recrystallization from ethyl alcohol yielded long needles of 2-(o-azidophenyl)benzotriazole, M.P. 77–78° C.

The same product was obtained, as shown by melting point and mixed melting point, when the o,o'-diazidoazobenz[bene]*ene* of Example IA after being subjected to extraction with decalin, was extracted with ether. The ether extract was concentrated, acetone added, heated, followed by dilution with water. On cooling, long needles of *2*-(o-azidophenyl)benzotriazole separated. This structure was confirmed by spectral analysis.

Analysis.—Calcd. for $C_{12}H_8N_6$: C, 61.01; H, 3.41; N, 35.58. Found: C, 61.04; H, 3.65; N, 35.94.

EXAMPLE III

Preparation of 2-(o-Azidophenyl)benzotriazole by Irradia[diation]*tion*

A solution of 5 g. of o,o'-diazidoazobenzene in 200 ml. of benzene was placed in a "Pyrex" glass flask and exposed to sunlight. Periodically, the stopper was opened to the air, thus permitting the gas pressure ($N_2$) which had been built up in the flask to be relieved. After 3 days, the reaction mixture was removed from the sunlight, purified and concentrated. On cooling, crystals separated, M.P. 76–77° C., which were identical to the 2-(o-[ozido-]*azido*-phenyl)benzotriazole of Example II.

EXAMPLE IV

Preparation of [Dibenzo-1,2,5,6-Tetraazacyclooctatetraene] *Dibenzo-1,3a,4,6a-Teteraazapentalene* From o,o'-Diazidoazobenzene

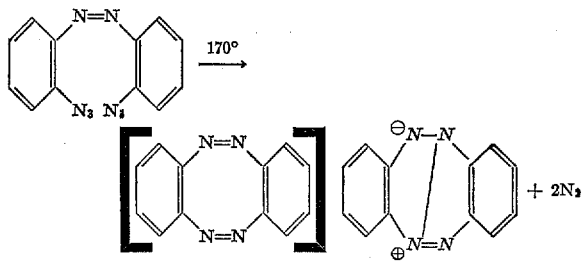

(A) The o,o'-diazidoazobenzene of Example IA was added to decalin. The decalin solution was heated at 170° C. for two hours. The solution changed from orange red to bright yellow color. Concentration of the decalin yielded 1 g. of yellow needles of [dibenzo-1,2,5,6-tetraazacyclooctatetraene] *dibenzo - 1,3a,4,6a - tetraazapentalene,* M.P. 237–238° C. The infrared spectrum showed the absence of the N—H or —$N_3$ functions. The general spectral features were in agreement with the assigned structure. The ultraviolet spectrum showed three main peaks at 2545 A. (ε 65,500), 3225 A. (ε 4,575) and 4020 A. (ε 40,000).

Analysis.—Calcd. for $C_{12}H_8N_4$: C, 69.22; H, 3.87; N, 26.91; M.W., 208. Found: C, 69.06; H, 3.99; N, 26.96; M.W[.]., 221.

(B) o,o'-Diazidoazobenzene (8.2 g.) prepared as shown in Example IB was heated with stirring in 700 ml. of decalin, the temperature being increased to 160° C. and maintained at 160–180° C. for 2½ hours. The decalin solution was then concentrated to 75 ml. (at reduced pressure) whereupon long, yellow needles of the tetraaza compound separated. The total yield of the [dibenzo-1,2,5,6-tetraazacyclooctatetraene] *dibenzo-1,3a,4,6a-tetraazapentalene* was 6.0 g. (93%).

EXAMPLE V

[Dibenzo - 1,2,5,6-Tetraazacyclooctatetraene] *Dibenzo-1,3a,4,6a-Tetraazapentalene* From 2-(o-Azidophenyl)-*Benzotriazole*

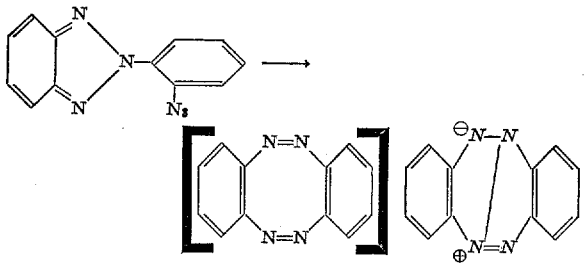

(A) A 0.1 g. sample of 2-(o-azidophenyl)benzotriazole was heated in decalin at 180° C. for 10 minutes. On cooling, long yellow needles of the tetraaza compound separated. The melting point, 236–238° C., was not depressed when mixed with some of the product of Example IV.

(B) A solution of 2-(o-azidophenyl)benzotriazole in benzene was exposed to sunlight for 10 days. During this time a crop of yellow crystals separated. The crystals were collected and identified as the tetraaza derivative, M.P. 235° C.

EXAMPLE VI

[Dinitrodibenzo - 1,2,5,6-Tetraazacyclooctatetraene] *Dinitrodibenzo-1,3a,4,6a-Tetraazapentalene*

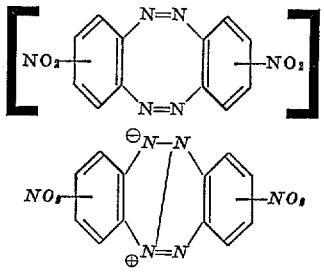

[Dibenzo-1,2,5,6 - tetraazacyclooctatetraene] *Dibenzo-1,3a,4,6a-tetraazapentalene* (1 g.) was added in small portions to 15 cc. of concentrated nitric acid at 5° C. with stirring. Stirring was continued for 30 minutes after the addition was completed. The mixture was then poured into ice water. A reddish solid separated and was collected by filtration and dried to give 1.4 g. (100% yield) of the dinitro derivative, M.P. above 300° C.

Analysis.—Calcd. for $C_{12}H_6N_6O_4$: C, 48.33; H, 2.03; N, 28.18. Found: C, 48.21; H, 2.25; N, 28.08.

EXAMPLE VII

[Hexachlorodibenzo - 1,2,5,6-Tetraazacyclooctatetraene] *Hexachlorodibenzo-1,3a,4,6a-Tetraazapentalene*

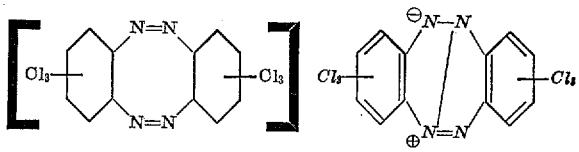

[Dibenzo - 1,2,5,6-tetraazacyclooctatetraene] *Dibenzo-1,3a,4,6a-tetraazapentalene* (1 g.) was dissolved in 50 ml. of hot carbon tetrachloride. A catalytic amount of ferric chloride and iodine was added and chlorine passed through the refluxing solution for three hours. The mixture was cooled to room temperature and let stand about 16 hours. Deep yellow crystals which separated were filtered and dried. The [hexachlorodibenzo - 1,2,5,6 - *tetraazacyclooctatetraene*] *hexachlorodibenzo-1,3a,4,6a-tetraazapentalene* thus obtained amounted to 0.48 g. and melted at 245–247° C.

Analysis.—Calcd. for $C_{12}H_2N_4Cl_6$: C, 34.73; H, 0.49; N, 13.50; M.W. 415. Found: C, 33.70; H, 0.97; N, 13,69; M.W. 445.

EXAMPLE VIII

Sulfonation of [Dibenzo-1,2,5,6-Tetraazacyclooctatetraene] *Dibenzo - 1,3a,4,6a - Tetraazapentalene* by Chlorosulfonic Acid

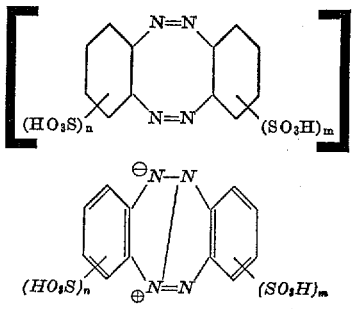

m+n=3

A mixture of 10 g. of chlorosulfonic acid and 0.5 g. of [dibenzo - 1,2,5,6 - tetraazacyclooctatetraene] *dibenzo-1,3a,4,6a-tetraazapentalene* was heated gradually from 0–90° C. At elevated temperatures, hydrogen chloride was evolved. Heating was continued for ½ hour at 90° C. The mixture was stirred for an additional hour while it gradually cooled. The mixture was then poured into five volumes of ice water. A bright yellow fluoroscent solid was removed by filtration.

Analysis.—Calcd. for $C_{12}H_8N_4S_3O_9$: C, 32.15; H, 1.80; N, 12.50: Found: C, 32.18; H, 2.10; N, 12.23.

The compounds of this invention are colored. o,o'-Diazidoazobenzene is an orange color while 2-(o-azidophenyl)benzotriazole is yellowish brown. [Dibenzo-1,2,5,6 - tetraazacyclooctatetraene] *Dibenzo - 1,3a,4,6a-tetraazapentalene* is yellow. All of these compounds are useful as dyes to produce yellow colors in textiles, and particularly in cotton fabrics. Thus when cloth is contacted with solutions of these compounds, rapid dyeing is achieved. For example, acetone containing 1–5% of the compound of Example VIII when applied to coarse cotton cloth rapidly dyed the fabric to a fluorescent yellow. The compounds of the other examples dye cotton to varying shades of yellow.

Compounds of this invention are fungicides, e.g., the hexachloro derivative of [dibenzotetraazacyclooctatetraene] *dibenzotetraazapentalene* (Example VI) was applied as a spray containing 0.08% active ingredient to apple foliage. After drying, the foliage was inoculated with spores of apple scab fungus (Venturia inaequalis). Following a suitable incubation period, the foliage that was treated with the tetraaza compound had only 6% of the disease exhibited by a control not employing the compound.

The compounds of this invention absorb [ultra-violet] *ultraviolet.* They are useful in the preparation of filters for absorption of ultraviolet light, e.g., for use in spectroscopic applications. Cellulosic films can be readily prepared which are also useful to protect articles of commerce from deleterious effects of ultraviolet light.

Obvious modifications in the present process will occur to those skilled in the art. Consequently, I propose to be bound solely by the appended claims.

The embodiments of the invention in which an exclusive property or privilege is claimed are defined as follows:

I claim:

1. Nitrogen-containing organic compounds having two benzenoid rings, to each of which are attached in the ortho position two nitrogens, the remaining bonds of said nitrogens being satisfied only through bonding to up to two other nitrogens, and said benzenoid rings being connected to each other solely through a plurality of the nitrogen atoms.

2. A compound of the formula

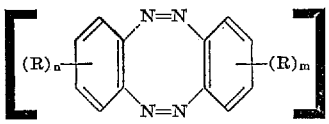

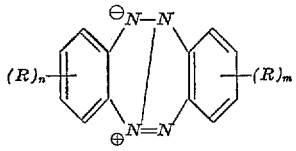

wherein R is an electronegative substituent selected from the class consisting of nitro, sulfo, chloro and bromo radicals and n and m are cardinal numbers of from zero to three.

3. [Dibenzo - 1,2,5,6 - tetraazacyclooctatetraene] *Dibenzo-1,3a,4,6a-tetraazapentalene.*

4. o,o'-Diazidoazobenzene.

5. 2-(o-azidophenyl)benzotriazole.

6. In a process for preparing a nitrogen-containing organic compound having two benzenoid rings, to each of which are attached in the ortho position two nitrogens, the remaining bonds of said nitrogens being satisfied only through bonding to up to two other nitrogens, and said benzenoid rings being connected to each other solely through a plurality of the nitrogen atoms, the steps which comprise diazotizing o,o'-diaminoazobenzene with nitrous acid and reacting the resulting diazonium salt with an alkali metal azide under acid conditions at a temperature below about 20° C., whereupon o,o'-diazidoazobenzene is obtained.

7. Process which comprises heating o,o'-diazidoazobenzene to a temperature within the range of 40 to 200° C., whereupon at least one compound of the class consisting of [dibenzo-1,2,5,6-tetraazacyclooctatetraene] *dibenzo-1,3a,4,6a-tetraazapentalene* and 2-(o-azidophenyl) benzotriazole is obtained.

8. Process which comprises heating to a temperature of at least 100° C. a polynuclear nitrogen-containing compound of the group consisting of o,o'-diazidoazobenzene and 2-(o-azidophenyl)benzotriazole, whereupon the desired [dibenzo - 1,2,5,6 - tetraazacyclooctatetraene] *dibenzo-1,3a,4,6a-tetraazapentalene* is obtained.

9. Process which comprises heating o,o'-diazidoazobenzene at temperatures of 40–100° C. to yield 2-(o-azidophenyl)benzotriazole.

10. Process which comprises heating o,o'-diazidoazobenzene at a temperature of from 100 to 200° C. to yield [dibenzo - 1,2,5,6 - tetraazacyclooctatetraene] *dibenzo-1,3a,4,6a-tetraazapentalene.*

11. Process which comprises heating 2-(o-azidophenyl)benzotriazole at a temperature of from 100 to 200° C. to yield [dibenzo - 1,2,5,6 - tetraazacyclooctatetraene] *dibenzo-1,3a,4,6a-tetraazapentalene.*

No references cited.